R. A. FESSENDEN.
METHOD AND APPARATUS FOR SUBMARINE SIGNALING.
APPLICATION FILED DEC. 31, 1917.

1,397,949.

Patented Nov. 22, 1921.
3 SHEETS—SHEET 1.

INVENTOR.
BY
ATTORNEYS

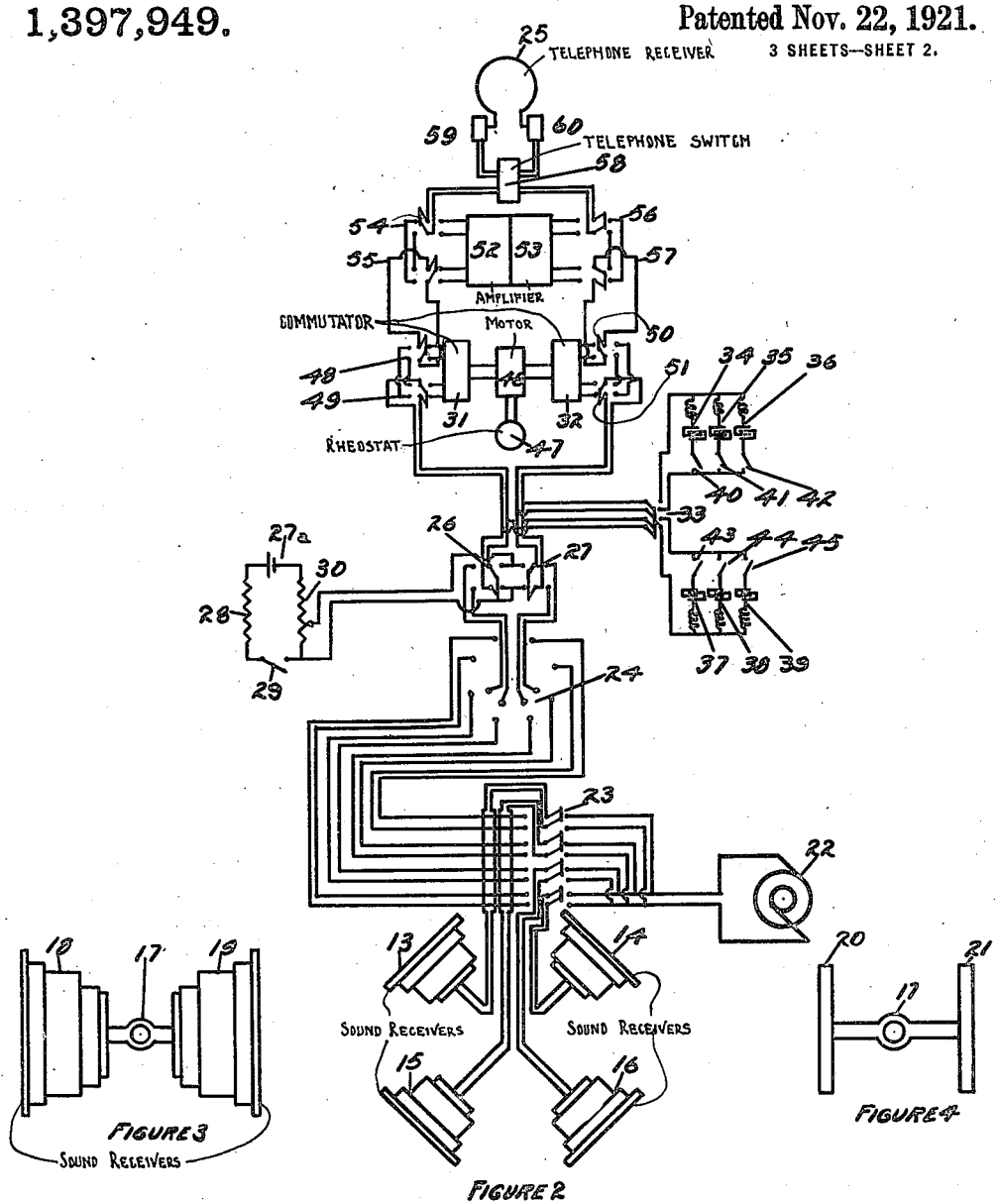

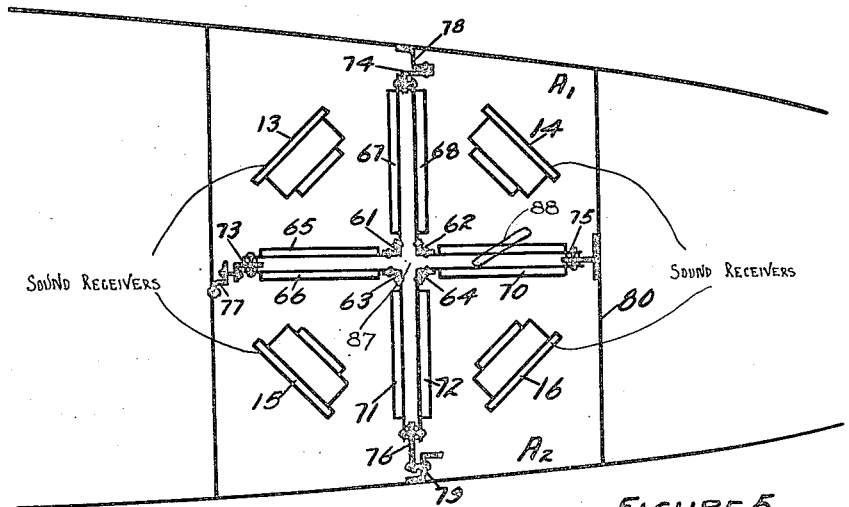

UNITED STATES PATENT OFFICE.

REGINALD A. FESSENDEN, OF BROOKLINE, MASSACHUSETTS, ASSIGNOR TO SUBMARINE SIGNAL COMPANY, OF PORTLAND, MAINE, A CORPORATION OF MAINE.

METHOD AND APPARATUS FOR SUBMARINE SIGNALING.

1,397,949.     Specification of Letters Patent.     Patented Nov. 22, 1921.

Application filed December 31, 1917. Serial No. 209,682.

*To all whom it may concern:*

Be it known that I, REGINALD A. FESSENDEN, of Brookline, in the county of Norfolk and State of Massachusetts, a citizen of the United States, have invented new and useful Improvements in Methods and Apparatus for Submarine Signaling, of which the following is the specification.

My invention relates to the generation and reception of impulses in elastic media and more particularly to sound waves, and still more particularly to submarine signaling and the detection of submarine bodies, more especially submarines.

The object of my invention is to increase efficiency along the lines above stated, as comprising the purpose of my invention, and more especially the detection of submarines, although the invention is applicable to many other uses.

Figure 1 is a diagrammatic horizontal section of the stern end of a ship showing the receiving or sending apparatus in position.

Fig. 1$^a$ is a side elevation of the apparatus taken within the ship.

Fig. 2 is a diagrammatic view of the electric circuits in their preferred form.

Fig. 3 is a plan view of an alternative form of oscillator mounting.

Fig. 4 is a similar view showing two microphones similarly mounted.

Fig. 5 is a plan showing the relation of the sound screens to the receivers.

Fig. 6 is a cross section of one of the sound screens showing the preferred manner of mounting it and longitudinally between the points numbered 73 and 75 of Fig. 5.

Fig. 7 shows other means of mounting the sound screen.

Figure 1A:
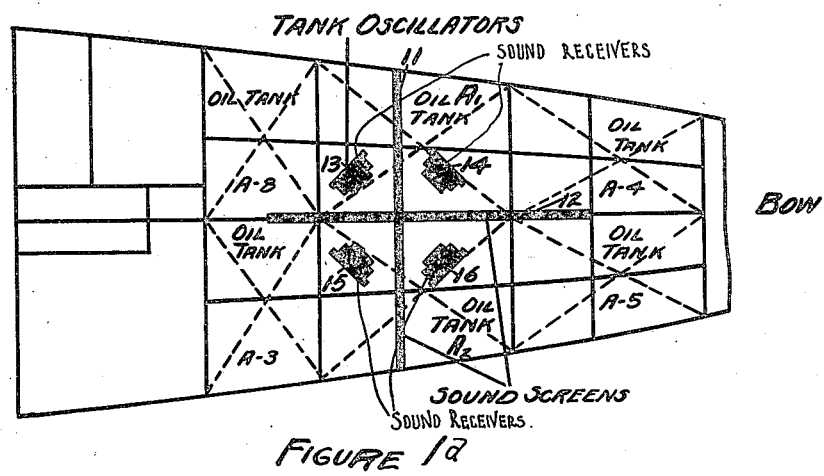
Figure 1:
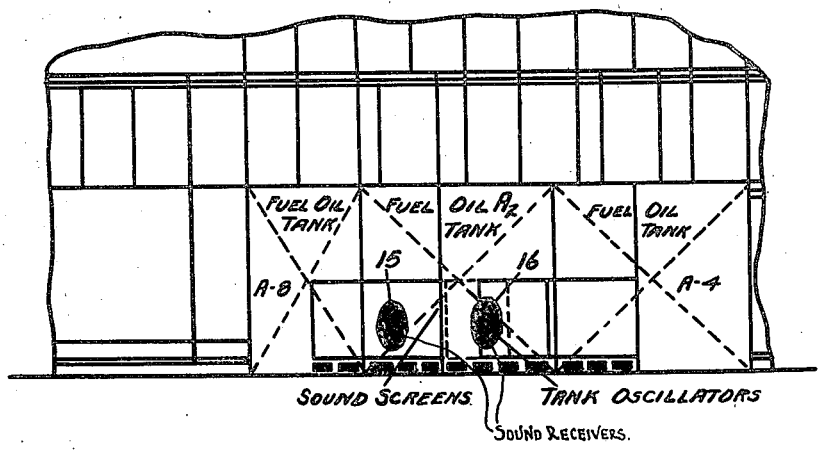

In Fig. 1, $A^1$, $A^2$, $A^3$, $A^4$, $A^5$ and $A^8$ are oil tanks, containing fuel oil or water. When it is desired to use the oil in any tank, for example $A^5$, the oil is first used out of one of the stern tanks of the vessel, and then the oil in $A^5$ is pumped into the stern tank and $A^5$ is then filled with sea water. In this way the tanks are always kept filled.

11 and 12 are sound screens which may be of any suitable type, for example of the types shown in detail in Figs. 5, 6 and 7. 13, 14, 15 and 16 are apparatuses for submarine signaling, for example, microphones or telephone receivers or Brocha tubes, or preferably, as shown Fessenden oscillators of the type described in U. S. Patent No. 1167366, issued January 4, 1916. These are arranged as shown, so that the oscillators are separated from each other by sound screens.

In place of using the submarine signaling apparatus in the manner shown two oscillators 18 and 19 may be mounted, as shown in Fig. 3, so as to rotate about the vertical axis 17, or two microphones 20 and 21 may be similarly mounted, as shown in Fig. 4.

A suitable arrangement of circuits is shown in Fig. 2 for four oscillators. Here 13, 14, 15 and 16 are the four oscillators. 22 is a source of alternating current, to be used when it is desired to use the oscillators for producing sound. 23 is an 8-pole switch for throwing the oscillators from sending to receiving. 24 is a 4-point switch whereby any two oscillators may be connected to the telephone receiver 25, by turning the switch. 26 and 27 are 2-pole double-throw switches for connecting the telephone receiver 25 to any pair of oscillators selected by the switch 24, or for connecting the telephone receiver to the commutator tester 27, 28, 29 and 30. 31 and 32 are commutators of any known construction suitable for the purpose.

This commutator tester consists of a dry cell $27^a$, a resistance 28, a key 29 and a second resistance 30. Its operation is as follows:

When it is desired to test whether the commutators 31 and 32 are working right, the switches 26 and 27 are thrown over so as to disconnect the oscillators and connect the commutator tester $27^a$, 28, 29 and 30.

The switch 48 is thrown to the right to bring commutator 31 into the circuit. The switch 49 is also thrown to the right to connect the other member of the commutator 31 with the switch points for switches 54 and 55. If switches 55 and 54 are thrown to the left the circuit continues to the telephone switch and from there to one or both of the ear pieces. To connect with the commutator 32 the same steps should be taken except that the switches 27, 50, 51, 56 and 57 should be thrown in the opposite direction as will be clearly understood.

When both commutators are in circuit with the tester on depressing the key 29 a small current will flow from the battery $27^a$ through the switches 26 and 27 and the commutators 31 and 32 to the telephone receiver 25 and if the commutators are working right a clear musical note will be heard, with a potential of a small fraction of a volt. If the commutators are not working right, either no sound will be heard or it will be ragged and unmusical and will indicate that one or both of the commutators must be put in proper shape.

33 is a 4-pole switch for connecting on the absorption circuits 34, 35, 36, 37, 38 and 39. Any single coil may be thrown on by means of the switches 40, 41, 42, 43, 44 and 45.

These absorption coils are of the type described in U. S. application No. 173614, filed June 8, 1917, and are for the purpose of cutting out undesirable resonant effects as stated in said specification. 31 and 32 are commutators for converting a continuous or alternating current of one frequency, generally a low frequency, into a high frequency alternating current, as described in U. S. Patent No. 1108895, issued September 1, 1914.

46 is a motor for driving these commutators and 47 is a rheostat for regulating the speed of the motor 46. 48, 49, 50 and 51 are double-pole double-throw switches for cutting out the commutators and leading the currents generated in the oscillators 13, 14, 15 and 16 to the head telephone 25 without being commutated by the commutators.

52 and 53 are amplifiers for amplifying the impulses generated by the oscillators either directly or after commutation by the commutators 31 and 32. 54, 55, 56 and 57 are double-pole double-throw switches for permitting the impulses generated by the oscillators to pass to the head telephone 25 without amplification. 58 is a telephone switch of the standard type for throwing on either ear piece of the telephone receiver 25 or both together. 59 and 60 are the ear pieces of the head telephone 25.

The sound screens shown diagrammatically in Fig. 1 may be made in a variety of ways. A suitable type is shown in Figs. 5, 6 and 7.

In Figs. 5, 6 and 7 $A^1$ and $A^2$ are the oil tanks. 13, 14, 15 and 16 are the oscillators. 61, 62, 63 and 64 are angles to which are bolted or riveted plates 65, 66, 67, 68, 69, 70, 71 and 72 as shown. The ends of these plates are bolted to other angles 73, 74 or T's 75 or straps 76, as shown, and these are connected to Z bars 77, 78 and 79 or the plating of the ship 80 as shown. Stiffening pieces 81 and 82 may be used as shown. The plates 65, 66, 67, 68, 69, 70, 71 and 72, together with top and bottom strips 83, 84, 85 and 86, form a cross shape chamber 87, as shown, which may be filled with air or a sound insulating material such as cork, etc., so as to form a sound insulating screen.

The tube 88 fastened at its lower end to the block of wood 89 and pierced with holes 90 at its lower end, is bent over so that its upper end 91 discharges into the tank $A^1$. 92 is a short piece of pipe fastened into the top strip 84.

The object of this device is to remove any oil which may leak into the cross shaped chamber 87, which is done by blowing air in the tube 92, thus driving out any oil which may have accumulated in chamber 87.

In place of using rigid connecting strips for the sides and ends of the chamber flexible or non-sound transmitting ends may be used, as shown in Fig. 7, where 65, 66 are plates and 93 is a longitudinal corrugated strip riveted by rivets 94 and 95 to the plates 65 and 66 so that any sound vibration striking 65 will not cause the plate 66 to act as the other leg of a tuning fork but will keep the sound insulated.

In place of using these stiffening strips 81 and 82 the plates 65 and 66 may be kept apart by putting pressure on the sound insulated chamber, in any convenient way, for example by compressed air. In this case it is preferred to hold the sides 65 and 66 together by means of wires 96, 97, 98 and 99 attached to lead balls 100 and 101. This is a very advantageous and generally applicable means of preventing sound vibrations from passing from one surface to the other because the sound vibrations received by the plate 65, on traveling along the wires or strings 96 and 98, are reflected on reaching the heavy balls of lead or similar material 100 and 101 and only a very small fraction of the sound continues to travel along the wires 97 and 99.

This method is applicable for screening sounds.

The operation of my device will be readily understood. By reason of the screening of the receivers, the sound waves received by each receiver are screened or prevented from approaching the other receivers. The commutators being properly tested as described above and adjusted if necessary, and the switches properly thrown to connect the receivers in pairs or singly as described with one or both of the ear pieces, the incoming sounds may be detected, undesirable resonant effects being cut out by the use of one or more absorption coils connected across the main lines. The system may thus be used to determine the direction from which sound waves arrive and also by the use of the absorption coils the character of the sounds, i. e., whether they are those which the observer is listening for or not, it being understood that vessels originate vibrations depending for their character upon size, structure, machinery, etc., so that a trained observer given the proper means such as I have described can usually distinguish the kind of vessel the compressional waves from which reach his ear. By such means as I have shown composite sounds, i. e., those arriving from different sources can be analyzed and the type of vessels where they originated be determined.

What I claim is:

1. A system of signaling by compressional waves comprising a plurality of means adapted to receive said compressional waves, means for acoustically insulating each of said receiving means from the others, and means for connecting said receivers in pairs to act conjointly, whereby, by said conjoint action, the orientation of the source of said compressional waves with reference to said plurality of receivers is indicated.

2. A system of signaling by compressional waves comprising a plurality of means adapted to receive said compressional waves and transform them into electrical impulses, means for acoustically insulating each of said receiving means from the others, means for indicating said electrical impulses, and electrical connections whereby said indicators may be connected in pairs to operate conjointly.

3. A system of signaling by compressional waves comprising a liquid filled tank containing a plurality of means adapted to receive said compressional waves and means for connecting said receivers in pairs to act conjointly, whereby, by said conjoint action, the orientation of the source of said compressional waves with reference to said plurality of receivers is indicated.

4. A system of signaling by compressional waves comprising a liquid filled tank containing a plurality of means adapted to receive said compressional waves, means for acoustically insulating each of said receiving means from the others, and means for connecting said receivers in pairs to act conjointly, whereby, by said conjoint action, the orientation of the source of said compressional waves with reference to said plurality of receivers is indicated.

5. A system of signaling by compressional waves comprising a liquid filled tank containing a plurality of fixed means adapted to receive said compressional waves and means for connecting said fixed receivers in pairs to act conjointly, whereby, by said conjoint action, the orientation of the source of said compressional waves with reference to said plurality of fixed receivers is indicated.

6. A system of signaling by compressional waves comprising a liquid filled tank containing a plurality of fixed means adapted to receive said compressional waves, means for acoustically insulating each of said fixed receiving means from the others, and means for connecting said fixed receivers in pairs to act conjointly, whereby, by said conjoint action, the orientation of the source of said compressional waves with reference to said plurality of fixed receivers is indicated.

7. A system of signaling by compressional waves comprising a liquid filled tank containing a plurality of means adapted to receive said compressional waves and transform them into electrical impulses, means for indicating said electrical impulses, and electrical connections whereby said indicators may be connected in pairs to operate conjointly.

8. A system of signaling by compressional waves comprising a liquid filled tank containing a plurality of means adapted to receive said compressional waves and transform them into electrical impulses, means for acoustically insulating each of said receiving means from the others, means for indicating said electrical impulses, and electrical connections whereby said indicators may be connected in pairs to operate conjointly.

REGINALD A. FESSENDEN.